(12) United States Patent
Kaplan et al.

(10) Patent No.: US 11,037,318 B1
(45) Date of Patent: Jun. 15, 2021

(54) SYSTEMS AND METHODS FOR RING SIZING

(71) Applicant: Size Inspector LLC, Hollywood, FL (US)

(72) Inventors: Erik Kaplan, Hollywood, FL (US); Marc Fischman, Bronx, NY (US)

(73) Assignee: SIZE INSPECTOR LLC, Hollywood, FL (US)

( * ) Notice: Subject to any disclaimer, the term of this patent is extended or adjusted under 35 U.S.C. 154(b) by 0 days.

(21) Appl. No.: 16/549,692

(22) Filed: Aug. 23, 2019

Related U.S. Application Data

(63) Continuation-in-part of application No. 15/949,768, filed on Apr. 10, 2018, now abandoned.

(60) Provisional application No. 62/483,513, filed on Apr. 10, 2017.

(51) Int. Cl.
G06T 7/60 (2017.01)

(52) U.S. Cl.
CPC ...... G06T 7/60 (2013.01); *G06T 2207/30196* (2013.01)

(58) Field of Classification Search
CPC ............ G01B 11/08; G06T 7/62; G06T 17/00
USPC .................................................. 356/614–640
See application file for complete search history.

(56) References Cited

U.S. PATENT DOCUMENTS

| | | |
|---|---|---|
| 625,959 A | 4/1873 | Bruhl |
| 39,049 A | 2/1908 | Scullin |
| D46,735 S | 12/1914 | Heller |
| D47,722 S | 8/1915 | Heller |
| D48,644 S | 2/1916 | Miller |
| 1,422,819 A | 7/1922 | Blaicher |
| 1,448,465 A | 3/1923 | Sherman |
| 1,553,198 A | 9/1925 | Stern |
| D68,641 S | 11/1925 | Robbins |
| D68,642 S | 11/1925 | Robbins |
| D68,644 S | 11/1925 | Robbins |
| D68,931 S | 12/1925 | Robbins |
| D74,909 S | 4/1928 | White |
| D83,453 S | 2/1931 | Krasnow |
| D85,234 S | 9/1931 | Gross |
| D85,505 S | 11/1931 | Zell |
| D88,266 S | 11/1932 | Stern |
| D92,694 S | 7/1934 | Bayardi |

(Continued)

FOREIGN PATENT DOCUMENTS

| | | |
|---|---|---|
| AR | 046897 B1 | 6/2013 |
| CA | 2568906 | 12/2005 |

(Continued)

OTHER PUBLICATIONS

[online] http://www.meritdiamond.com/mfit/. Retrieved Feb. 4, 2016.

(Continued)

*Primary Examiner* — Tri T Ton
(74) *Attorney, Agent, or Firm* — Malloy & Malloy, P.L.

(57) ABSTRACT

Ring-sizing systems and methods herein use one or more photographic images or videos that contain an image of one or more fingers. The images can be captured, for example, by a smartphone. Using sophisticated image analysis, sensor data of the smartphone, and/or historical data of ring sizes, the systems and methods disclosed herein can then determine the ring size of a finger or fingers desired to be measured.

20 Claims, 7 Drawing Sheets

(56) References Cited

U.S. PATENT DOCUMENTS

| | | | |
|---|---|---|---|
| D96,056 S | 6/1935 | Sager | |
| 2,009,390 A | 7/1935 | Bayardi | |
| 2,016,679 A | 10/1935 | Mayer | |
| D109,085 S | 3/1938 | Soroka | |
| 2,109,609 A | 3/1938 | Aull | |
| D160,275 S | 9/1950 | Rodriguez | |
| 3,022,648 A | 2/1962 | Thaler | |
| 201,378 A | 6/1965 | Katz | |
| D203,551 S | 1/1966 | Transfield | |
| 3,360,959 A | 1/1968 | Schechter et al. | |
| 3,557,571 A | 1/1971 | Santo | |
| 3,643,467 A | 2/1972 | Postel | |
| 3,805,549 A | 4/1974 | Nielson | |
| 4,086,786 A | 5/1978 | Ritter | |
| D248,286 S | 6/1978 | Barr | |
| D248,741 S | 8/1978 | Barr | |
| 4,170,118 A | 10/1979 | Block | |
| 4,218,894 A | 8/1980 | Tropea | |
| D264,060 S | 4/1982 | Epstein | |
| D277,171 S | 1/1985 | Bulgari | |
| D279,462 S | 7/1985 | Weikel | |
| 4,631,929 A | 12/1986 | Hollingworth | |
| D297,718 S | 9/1988 | Cohen et al. | |
| D298,422 S | 11/1988 | Messa | |
| 4,781,705 A | 11/1988 | Shepherd et al. | |
| 4,793,156 A | 12/1988 | Pence | |
| D299,912 S | 2/1989 | Goldman et al. | |
| D301,121 S | 5/1989 | Messa | |
| D302,954 S | 8/1989 | Goldman et al. | |
| 4,970,878 A | 11/1990 | Lee | |
| D312,597 S | 12/1990 | Bulgari | |
| 5,129,851 A | 7/1992 | Villanueva | |
| 5,170,643 A | 12/1992 | Porcell, Jr. | |
| D360,376 S | 7/1995 | Kaplan | |
| D365,780 S | 1/1996 | Kaplan | |
| 5,520,016 A | 5/1996 | Liu | |
| 5,588,309 A | 12/1996 | Chioffe | |
| 5,588,310 A | 12/1996 | Lai | |
| 5,605,059 A | 2/1997 | Woodward | |
| 5,792,175 A | 8/1998 | Yoo | |
| D400,470 S | 11/1998 | Ambar | |
| D418,081 S | 12/1999 | Kaplan | |
| 6,032,486 A | 3/2000 | Uchin | |
| D422,935 S | 4/2000 | Chan | |
| 6,116,053 A | 9/2000 | Siebenberg | |
| 434,693 A | 12/2000 | Kaplan | |
| D438,813 S | 3/2001 | Yellen | |
| D445,058 S | 7/2001 | Kaplan | |
| D453,908 S | 2/2002 | Kaplan | |
| D454,090 S | 3/2002 | Kaplan | |
| 6,354,106 B1 | 3/2002 | Kataw | |
| D459,674 S | 7/2002 | Razza | |
| 6,427,486 B1 | 8/2002 | Yellen | |
| 6,701,618 B2 | 3/2004 | Gefen | |
| D491,092 S | 6/2004 | Kurdi | |
| 6,857,289 B1 | 2/2005 | Cheng | |
| D522,902 S | 6/2006 | Kaplan | |
| D541,693 S | 5/2007 | Skuza et al. | |
| 7,296,439 B2 | 11/2007 | Tanory, Jr. | |
| 7,350,377 B2 | 4/2008 | Kaplan | |
| 7,430,879 B2 | 10/2008 | Czajka et al. | |
| 7,631,517 B2 | 12/2009 | Kaplan | |
| D656,615 S | 3/2012 | Tzeng | |
| 8,453,709 B1 | 6/2013 | Williams | |
| D717,686 S | 11/2014 | Aoki | |
| D718,173 S | 11/2014 | Sandberg | |
| 9,165,318 B1 * | 10/2015 | Pauley | G06Q 30/0643 |
| 9,226,552 B1 | 1/2016 | Makhoulian et al. | |
| D780,614 S | 3/2017 | Kaplan | |
| 2002/0127128 A1 | 9/2002 | Har-Shai | |
| 2005/0268653 A1 | 12/2005 | Kaplan | |
| 2006/0277946 A1 | 12/2006 | Lu | |
| 2007/0137250 A1 | 6/2007 | Kohl | |
| 2008/0148774 A1 | 6/2008 | Thurber | |
| 2011/0289966 A1 | 12/2011 | Ahrenholtz et al. | |
| 2016/0246326 A1 * | 8/2016 | von Badinski | G08B 5/36 |

FOREIGN PATENT DOCUMENTS

| | | |
|---|---|---|
| JP | 3096467 | 7/2002 |
| WO | WO2005120279 | 12/2005 |

OTHER PUBLICATIONS

[online] http://s-media-cache-ak0.pinimg.com/736x/44/eb/f7/44ebf743ee7338a8caf3daa3734a369b.jpg. Retrieved Feb. 4, 2016.

* cited by examiner

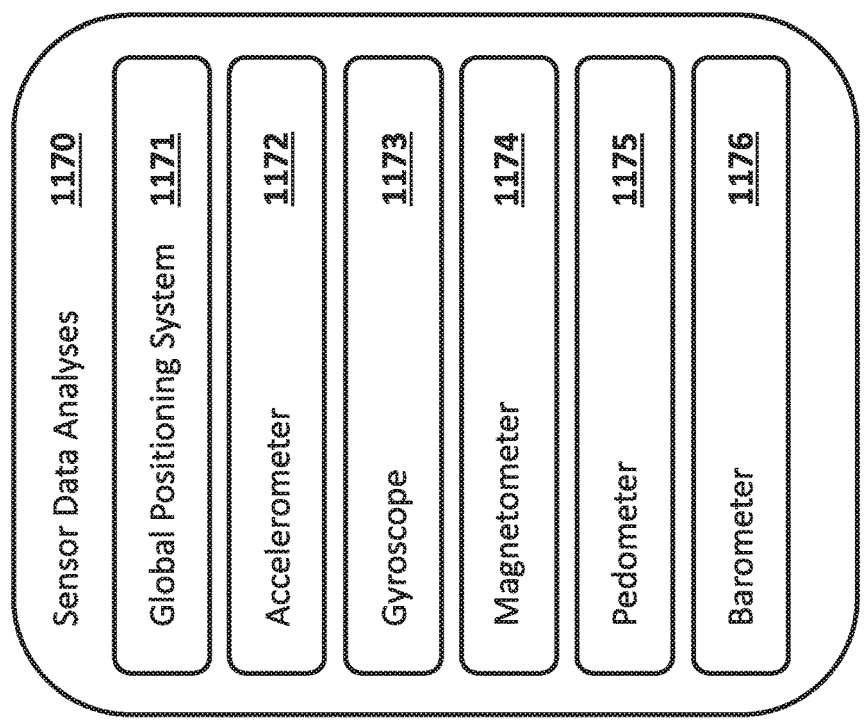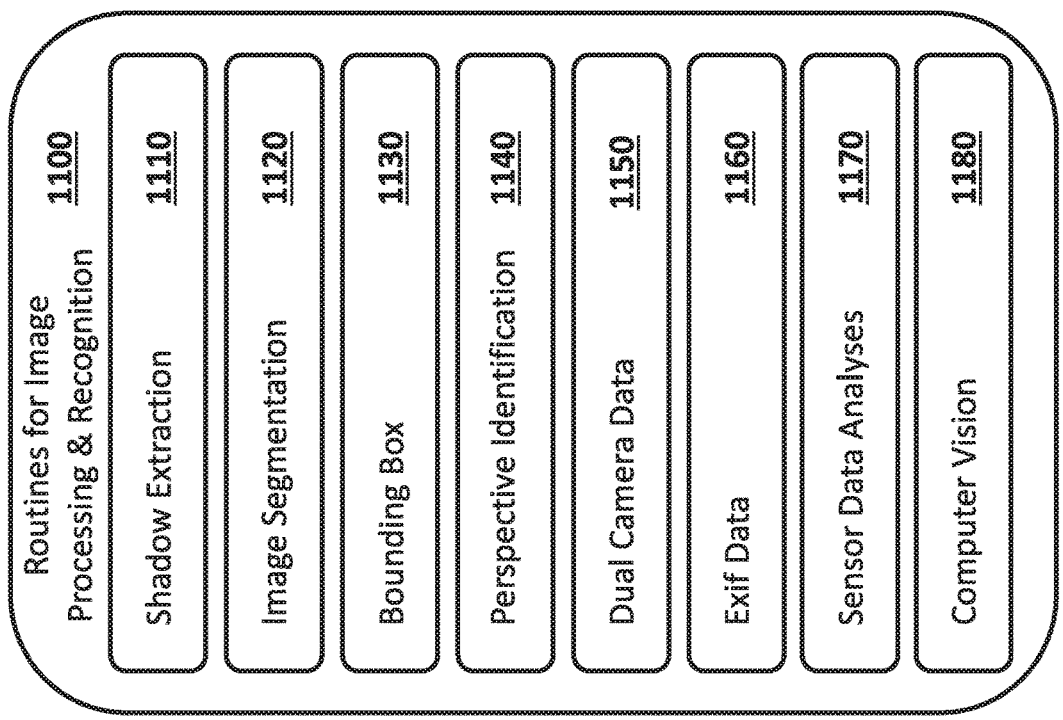
Figure 4

SYSTEMS AND METHODS FOR RING SIZING

CLAIM OF PRIORITY

The present application is a continuation-in-part application of a previously filed, now pending patent application having Ser. No. 15/949,768, filed on Apr. 10, 2018, which itself claims priority pursuant to 35 U.S.C. Section 119(e) to a prior filed provisional patent application, namely, that having Ser. No. 62/483,513 filed on Apr. 10, 2017, the contents of which is incorporated herein by reference in its entirety.

BACKGROUND OF THE INVENTION

Field of the Invention

The present disclosure is directed to systems and methods for sizing a ring using image processing.

Description of the Related Art

Retail jewelers, of course, must know the size of a person's finger in order to provide a ring that will fit that finger. Jewelers may be provided the measurements by the purchaser of the ring, or they may be provided an existing ring of the future wearer, or the future wearer may come in for a personal sizing of the finger. These methods are all time-consuming and still include a large degree of inaccuracy in the measurements. Afterward, the eventual ring-wearer will have to come into the jewelry store for any adjustments if the ring does not fit well enough. For example, jewelry store size estimations using the standard methods often require additional sizing in order to make the ring fit the wearer better.

For example, while it is commonly known an accurate ring size measurement requires a precision of 0.2 millimeters, a hand-measured estimate done in the jewelry store generally only results in a particular size or half-size, which equates to a precision range of 0.8 millimeters to 0.4 millimeters respectively. If the measurement falls between a full-size and a half-size, then the jeweler can determine a quarter-size adjustment is needed, which equates to 0.2 millimeters. Based on having to rely on at most only a quarter-size variant, as well as the time-consuming multiple trips needed to finally get a ring that fits, there is a need for a better solution.

Additionally, there are instances where a person may want to determine another person's ring size, say when a person is purchasing an engagement ring for their partner. In such an instance, it is often difficult to determine the ring size of a person's partner for at least the reasons set forth above, which are only exacerbated due to the lack of resources available to the layperson. Further, where a proposal is sought to be a surprise, the necessity to determine a partner's ring size in secret further complicates the matter. Thus, there is a need for a better solution where a person may easily and secretly obtain another person's ring size with a precision of 0.2 millimeters.

SUMMARY OF THE INVENTION

Some or all of the above needs and/or problems may be addressed by various embodiments of the disclosure. Certain embodiments may include systems and methods for sizing a ring.

According to one embodiment of the disclosure, there is disclosed a method effectuated by at least one processor. The method may include acquiring an image, identifying a hand, and further identifying a finger, within a photographic image. The method may further include isolating the identified finger from the photographic image and measuring a first size of the identified finger in a digital image measurement unit, such as pixels. The method may then convert the first size into a second size, measured in a standard measurement unit, such as millimeters, and then further adjust the second size into a third size based on the anatomy of the user's finger. In this manner, the method may accurately determine the ring size of a desired finger based on a photographic image.

As a preliminary matter, it is important to discuss why a first size must be measured and converted into a second size before being adjusted into a third size, as described in the aforementioned embodiment. As can be understood, because the first size is measured from the photograph and is in a digital measurement unit, such as pixels, such a measurement cannot be used as a ring size for a user. Thus, the measured first size must be converted into a standard measurement unit, such as millimeters, herein referred to as the second size. However, although the second size may be used as a ring size for a user because it is in a standard measurement unit, the second size will most likely be inaccurate and not fall within the necessary precision range of 0.2 millimeters because the second size does not take into account the actual anatomy of the finger, as discussed below.

The anatomy of a finger includes bones and hard, rigid joints which are surrounded by muscles, ligaments, and skin which may be described as fleshy or spongy. Thus, when a user puts on a ring, the ring must be large enough to at least allow the bones and hard, rigid joints to pass through it because the materials may not be deformed. However, the ring need not necessarily be large enough to allow all of the fleshy or spongy material to pass through it because at least some of the fleshy, spongy material may be temporarily deformed in a way which allows a ring to pass over it.

With these anatomical characteristics of the finger in mind, and with further reference to the original measurement of the first size, it can be understood that the measurement of a ring size from a photographic image will only measure around the wider fleshy or spongy material as the bones and hard, rigid joints will be hidden from view. Thus, because the original first size is measured from the wider fleshy, spongy material and is then converted into the second size, the second size must be adjusted into a third size in accordance with the aforementioned anatomical characteristics of the finger.

Returning to the aforementioned embodiment of the disclosure, the embodiment may be augmented according to several additional features of the claimed invention. For instance, the method according to this embodiment may perform at least one of a plurality of routines directed towards various types of image processing and/or recognition tasks. As discussed below, these routines may be used in a variety of ways and throughout the processing of this method. In this manner, the method may accurately determine the ring size of a desired finger based on a photographic image.

Similarly, this embodiment may further adjust the second size into a third size by performing at least one of a plurality of routines directed to anatomical analyses and using stored process data in connection with a known plurality comparison. For example, the data and values associated with the first size, second size, and third size, in addition to the accuracy of the third size, which may be input into the method by a user, may then be stored and subsequently accessed by the method in future ring size estimates.

Further, this embodiment may be configured in an input/output relationship with a device, such as a personal computing device, which may, amongst other things, capture a photographic image via a camera, or alternatively, provide additional inputs into the processing system, such as the accuracy of the third size or movement of a bounding box when isolating the desired finger.

Through the performance of the aforementioned method, the enhancements thereto, and any other methods which may be expressly or inherently disclosed herein, the ring size of a finger may be determined in an easy, accurate, reproducible, and secret manner.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 4 is an exemplary block diagram representing a plurality of routines used in the method disclosed in FIG. 3.

Like reference numerals refer to like parts throughout the several views of the drawings.

DETAILED DESCRIPTION OF THE PREFERRED EMBODIMENT

Illustrative embodiments of the disclosure will now be described more fully hereinafter with reference to the accompanying drawings in which some, but not all, embodiments of the disclosure are shown. The disclosure may be embodied in many different forms and should not be construed as limited to the embodiments set forth herein; rather, these embodiments are provided so this disclosure will satisfy applicable legal requirements.

Figure 1:
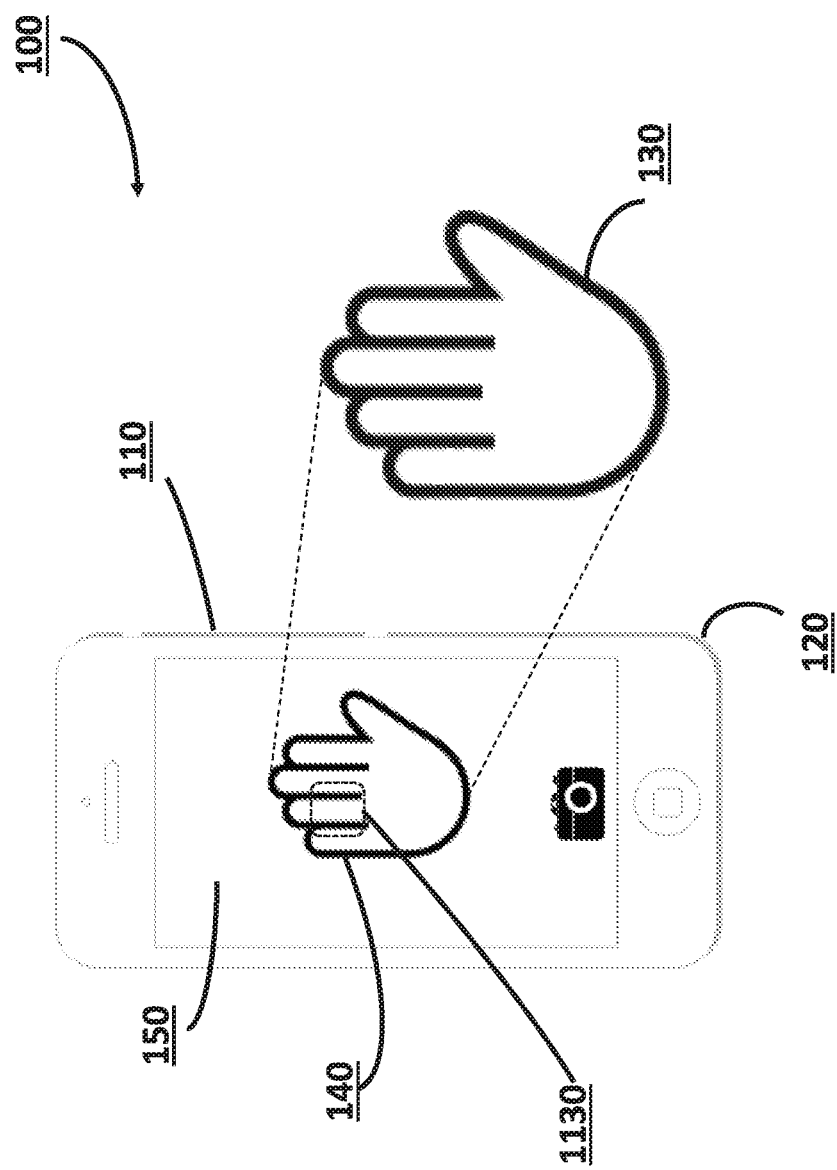
FIG. 1 is an embodiment of a device configured for sizing a ring.

In reference to FIG. 1, disclosed is an embodiment of a device 100 configured to determine the ring size of an identified finger. According to this embodiment, the device 100 includes at least one processor or microprocessor 120. The processor 120 may reside on a personal computing device 110, such as a cellular phone or tablet. The personal computing device 110 may, for example, be connected to one or more computers via the Internet, and may therefore share some operations with any other connected computers. Optionally, multiple Internet-connected computers may store any relevant data about ring sizes, and the determination thereof, and may additionally share that data with the personal computing device 110. Personal computing device 110 may then use that data in determining the ring size of a user, who may be defined as either the actual user of the personal computing device 110, or alternatively, a different person whose ring size is sought to be determined. Alternatively, personal computing device 110 may transmit a photographic image of a hand or finger(s) to one or more connected computers, and the connected computers can determine the ring size based on the received image data and any other stored data on the connected computers such as, for example, historical data relating to ring sizes as discussed below.

In the embodiment disclosed in FIG. 1, the personal computing device 110 includes an interface for capturing a photographic image 140. The photographic image 140 may be stored on the personal computing device 110, or it can be only displayed on the screen of the personal computing device 110 without being stored thereon. Alternatively, an image capturing mechanism of the personal computing device 110 is not utilized but, instead, the photographic image 140 may be transmitted to the personal computing device 110 from another source.

For instance, when the finger to be sized is not within range of the camera of the smartphone 110, an image 140 of the finger can be received by the personal computing device 110 from the smartphone of another person, such as the person whose finger is to be measured. An image 140 may also be accessed by the personal computing device 110 via a local or wide area network such as the internet. The personal computing device 110 alternatively may access photographs stored on its own memory, or on a computer memory to which it has access, and then use that stored image to determine the size for the ring.

In the embodiment disclosed in FIG. 1, the photographic image 140 includes the finger to be sized, as well as any background images that are also within range of the image captured. Occasionally, the photographic image 140 includes an entire hand and the device 100 thus disseminates the dimensions of a single finger from the entire photographic image 140, in order to size a ring for that single finger. Likewise, personal computing device 100 can disseminate the dimensions of multiple fingers from a single photographic image 140, and can subsequently size each and every finger in the photographic image 140. In such an instance, the ring sizes of the individual fingers can be processed serially one after another, or the processes can work in parallel. Further, personal computing device 110 can instead connect to multiple computers via the internet, and the multiple connected computers can process the photographic image 140 in order to determine one or all of the ring sizes for the desired fingers. The connected computers and the personal computing device 140 can also share the processes for determining a single ring size.

As previously stated, the device 100, as shown in FIG. 1, can disseminate a photographic image 140 of a finger or hand from a larger background 150 of the photographic image 140. To facilitate the dissemination of an image 140, the device 100 may include a bounding box 1130 on the display screen of a personal computing device 110. The bounding box 1130 can serve to assist the device holder in capturing the photographic image 140 of an actual hand 130. The device holder may be the owner of the hand 130 in the photographic image 140, or the device holder can capture the photographic image 140 of someone else's hand 130. The bounding box 1130 can be a plurality of shapes, including without limitation, a rectangular shape, a hand-shape, or a finger-shape.

While device 100 may disseminate finger data from a background 150 of a photographic image 140 without the use of a bounding box 1130, the bounding box 1130 may assist the personal computing device 110 in the dissemination by, amongst other things, narrowing the region of focus. For example, bounding box 1130 can serve to limit the region of interest for personal computing device 110 to the part of the photographic image 140 that is located solely within the bounding box 1130. Thus, the personal computing device 110 may be oriented by the device holder to coordinate bounding box 1130 over and/or around a desired finger or fingers to be sized. Likewise, the device holder may access a stored photographic image 140 and may coordinate bounding box 1130 to cover the area of the desired fingers. Further, the placement of the bounding box 1130 may instead be adjusted by the device holder and placed over the desired finger or fingers to be sized. For example, the device holder can touch the display screen of personal device 110 in the area displaying bounding box 1130 and drag bounding box 1130 over the area that includes the desired fingers.

Figure 2:
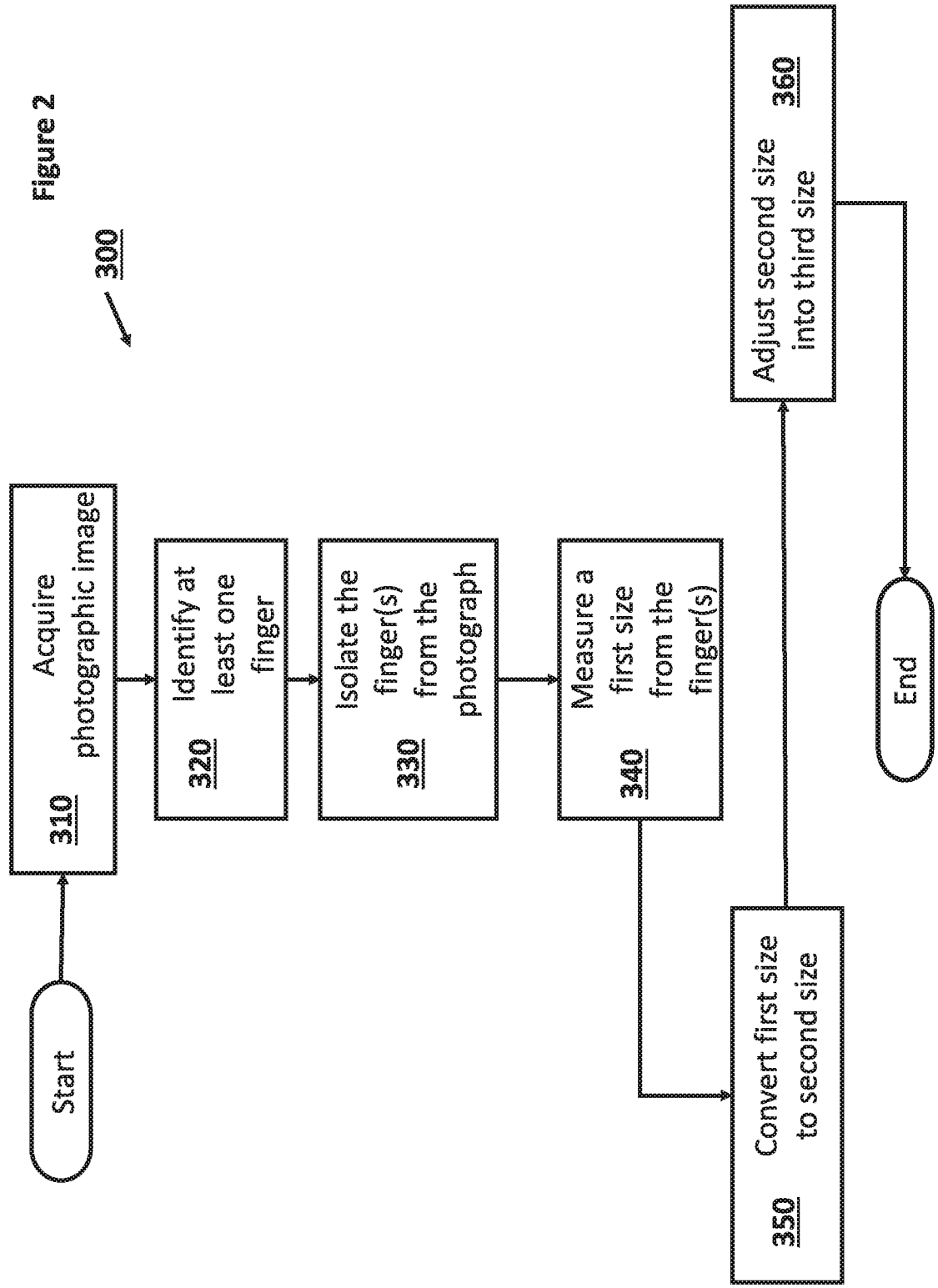
FIG. 2 is a flow diagram of an example method for sizing a ring.

FIG. 2 discloses a flow diagram representing one embodiment of a method for determining a ring size from a photographic image 140. As can be seen, when the method 300, or alternatively instructions 300 executed by the processor 120, disclosed in FIG. 2 starts, first a photographic image 140 is thereby acquired 310. The photographic image 140 may preferably consist of a digital image, and may consist of, in addition to other possibilities not mentioned here, only one image, a plurality of images, two images from different sources, or a video.

Once the photographic image 140 is acquired 310, the processor 120 will first identify at least one finger 320 within the photographic image 140. As previously discussed, the personal computing device 110 may optionally identify multiple fingers for sizing, may perform such identification and any subsequent process either serially or in parallel, and may likewise perform such identification or any subsequent process either on its own or in connection with multiple computers via the internet.

Once at least one finger for sizing has been identified 320, the personal computing device 110 may then isolate the identified finger(s) 330 from the photographic image 140. The isolation of the identified finger(s) 330, in addition to the other processes discussed in the method disclosed in FIG. 2, may be effectuated at least through a plurality routines directed to image processing and recognition, as discussed below.

Next, the processor measures a first size from the identified finger(s) 340. Such a measurement is based on the photographic image 140 used, and is thus determined in a digital image measurement unit, such as pixels. The processor makes the measurement of a first size 340, in part, by identifying the size of the widest cylindrical parts of each segment of the identified finger(s). The processor will also identify the size of the cylindrical part of the finger found at the median of the identified widest cylindrical parts. Specifically, the processor will identify the diameter of the finger(s) at the proximal interphalangeal joint(s) and at the proximal phalanx(s), as close to the metacarpophalangeal joint(s) as possible. In this manner, the processer can accurately determine the widest circumference on a finger that a ring must pass through and also the circumference of the location the ring is likely to sit, thus determining the ring size to be the greater of the two.

Because the processor determines the first size in a digital image measurement unit, such as pixels, the processor must then convert the first size of the finger into a second size 350, which may be in a standard measurement unit, such as millimeters. Conversion of the first size into the second size 350 may be effectuated at least through various routines directed towards image processing and recognition tasks, as discussed below.

Once the processor has determined the second size in a standard measurement unit, a ring size may initially be determined. However, such ring size is likely to be inaccurate because the value of the second size is still predominantly based on an image and thus fails to take into account the anatomical characteristics of fingers, both generally and with specificity to the user. Therefore, the processor will then adjust the second size into a third size 360. The adjustment process 360 may be effectuated at least through a plurality of routines for anatomical analyses, as discussed below. Following the adjustment of the second size into the third size 360, the method as described in FIG. 2 is complete.

Figure 3:
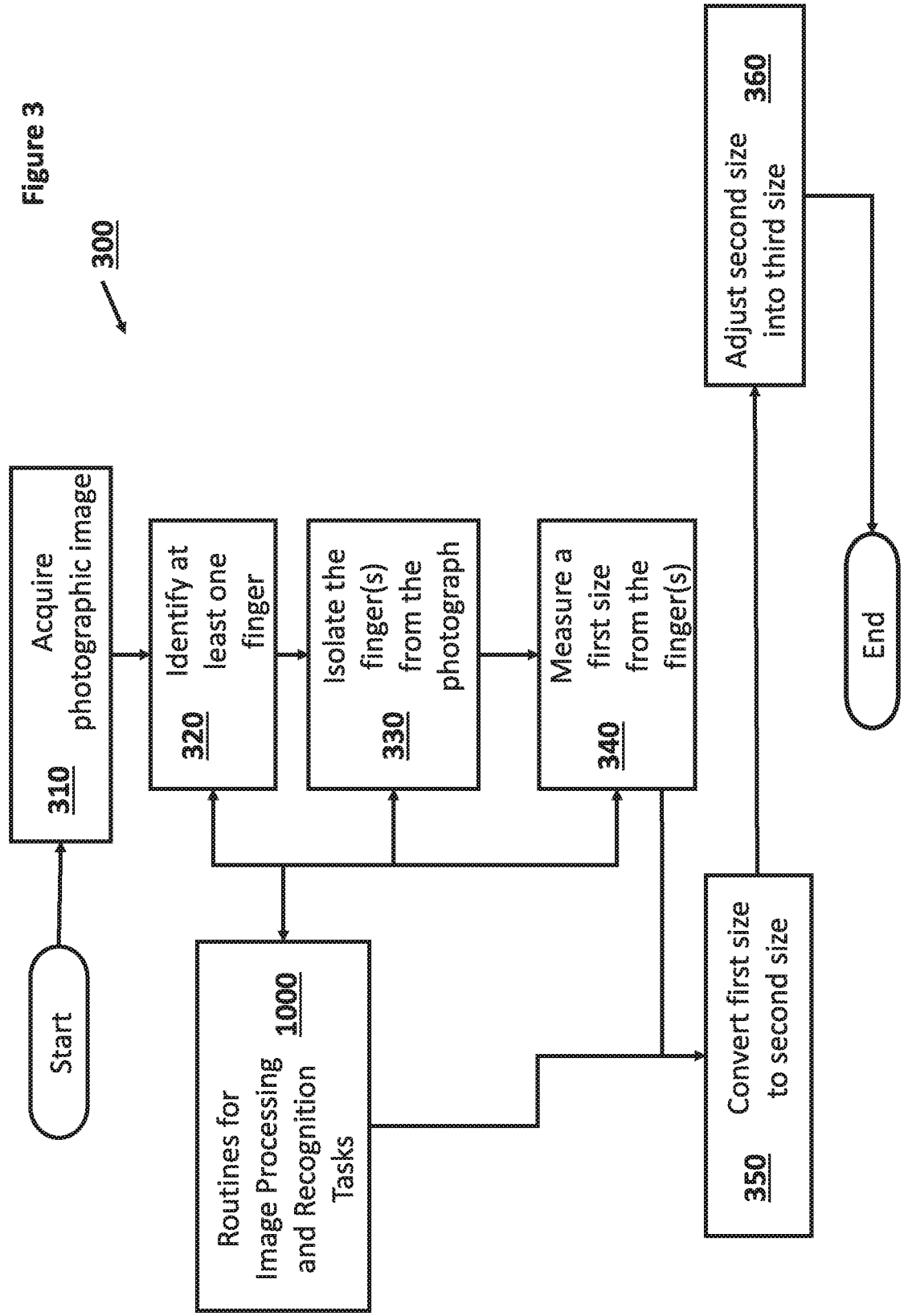
FIG. 3 is a flow diagram of the method shown in FIG. 2, further including the performance of at least one of a plurality of routines involved in said method.

As can be seen, FIG. 3 discloses an augmentation to the method disclosed in FIG. 2. In effect, all of the aforementioned steps disclosed in FIG. 2 remain the same, however, routines directed towards image processing and recognition tasks 1000 are performed throughout the ring sizing process. For instance, the routines directed towards image processing and recognition tasks 1000 may be performed by the processor 120 to at least identify at least one finger in the photographic image 320, isolate the at least one finger from the photographic image 330, measure a first size from the at least one finger 340, and convert the first size into a second size 350. The particular routines directed towards image processing and recognition tasks will be discussed further below with reference to FIG. 4.

FIG. 4 depicts a block diagram designed to illustrate a plurality of exemplary routines directed towards image processing and recognition tasks 1000 performed by the processor 120 throughout the ring sizing process. The routines disclosed within this group are generally directed towards either the manipulation of the photographic image by the processor (image processing) or the identification of objects in an image (image recognition). It should be understood that none of these routines, only one of these routines, all of these routines, a combination thereof, or a further routine not mentioned here, may be used in the ring sizing method 300 disclosed in FIGS. 2, 3, and 7. Each exemplary routine will now be briefly defined such that each routine's impact on the method 300 may be better understood.

Shadow extraction 1110 involves the process of identifying and eliminating shadows from an image to increase the performance of subsequent object recognition and image matching tasks. Thus, in the method 300 shadow extraction 1110 may at least be used to identify at least one finger from the photographic image 320 and to isolate the at least one finger from the photographic image 330.

Image segmentation 1120 refers to the process of partitioning a digital image into multiple segments, thus changing the representation of the image into something easier to analyze. Specifically image segmentation 1120 aims to understand the role of each pixel in an image by grouping and classifying individual pixels. Thus, in the method 300 image segmentation 1120 may at least be used to identify the at least one finger from the photographic image 320, to isolate the at least one finger from the photographic image 330, and to measure a first size from the least one finger 340.

A bounding box 1130 may be used to define the coordinates which fully enclose a piece of an image. As used in the device and method 300, and as previously discussed with respect to the device 100 of FIG. 1, the bounding box 1130 may take the shape of at least a rectangle, an oval, a hand-shape, or a finger-shape. Thus, in the method 300 a bounding box 1130 may at least be used to identify the at least one finger from the photographic image 320 and to isolate the at least one finger from the photographic image 330.

Perspective identification 1140, involves identifying the depth and spatial relationships between objects in a photograph. At least one aim of perspective identification 1140 as used in the disclosed embodiment, is to determine the focal point of the camera, thus allowing the processor to determine the distance between the hand and the camera, which may, amongst other things, facilitate the conversion from a digital image measurement unit, such as pixels, to a standard measurement unit, such as millimeters. One exemplary way perspective identification 1140 may be performed is through the use of an object with a known size, whereby the processor may ascertain the sizes and spatial relationships of other objects within the image by comparison with the object of known size. Thus, in the method 300 perspective identification 1140 may be used at least to isolate the at least one finger from the photograph 330, measure the first size from the at least one finger 340, and convert the first size into a second size 350.

Dual camera data 1150 may refer to the use of two or more lenses within a camera, and are a common feature of smartphones. Typically, such an arrangement allows greater clarity of the image, additional zooming functionality, and occasionally a greater ability to capture the depth of the field. Alternatively, dual camera data, as used in method 300, may also allow for the comparison between two photographic images. Such a comparison allows, for example, the processor 120 to determine location data from when each photographic image 140 was taken, and thus determine the ratio of pixel distance differences, which ultimately assists in the conversion from the first size to the second size 350 by the processor 120. Thus in the method 300, dual camera data 1150 may be used throughout the disclosed method.

Exif data 1160 comprises a range of settings and data associated with a photographic image such as, ISO speed, shutter speed, lens type, and focal length. Typically, in a digital photograph the exif data 1160 may be configured as metadata. Thus, with respect to the disclosed method, the use of exif data 1160, at least with respect to digital images, first requires extracting the metadata for subsequent use. Then, the settings and data information stored as exif data 1160 may be used in combination with the foregoing and subsequent routines to further enhance their processing speed and accuracy. Therefore, it may be understood that exif data 1160 may be used throughout the disclosed method 300.

Sensor data analyses 1170 comprise the various sensor data information which may be acquired upon the taking of a picture. Similar to exif data 1160, sensor data information may be extracted from the various sensors found within the device taking the photographic image and used throughout the disclosed method 300. As is shown in FIG. 4, various exemplary sensors may include the global positioning system 1171, the accelerometer 1172, the gyroscope 1173, the magnetometer 1174, the pedometer 1175, and the barometer 1176. Any one of these sensors, or even additional sensors not mentioned here, may be used in the disclosed method 300.

For example, when using the data acquired by the accelerometer 1172, the processor 120 may determine the linear acceleration of a photographic device at the time the photographic image 140 was obtained. Further, when using the data acquired by the gyroscope 1173, the processor 120 may determine the angular rotational velocity of a photographic device at the time the photographic image 140 was obtained. Thus, when using the data from both the accelerometer 1172 and the gyroscope 1173 in concert, the processer 120 may determine the total orientation of a photographic device at the time the photographic image 140 obtained. Further, when that sensor data analysis 1170 is combined with other routines such as, for example, exif data 1160 and perspective identification 1140, the perspective of the objects in the photographic image 140 may easily and accurately be obtained by the processor.

Finally, computer vision 1180 is a general term referring to the performance of various visual recognition tasks, such as image classification, localization, and detection amongst a plurality of other tasks and routines. It should be understood various computer vision 1180 routines may be used throughout the disclosed method 300.

Figure 5:
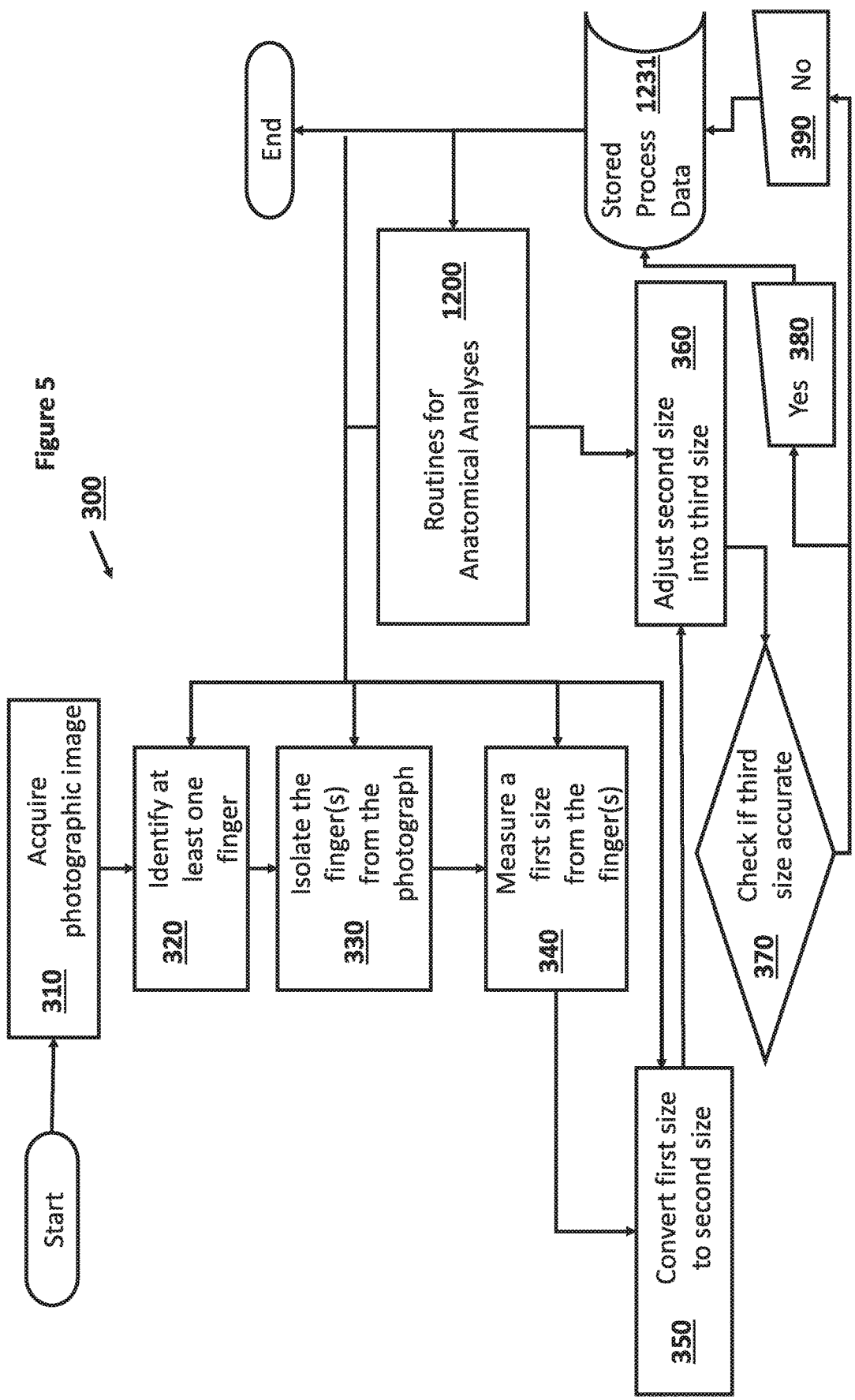
FIG. 5 represents the method shown in FIG. 2, further including accuracy inputs and storing and accessing functionality.

With reference to FIG. 5, disclosed is a further augmentation to the method 300 disclosed in FIG. 2. In effect, all of the aforementioned steps disclosed in FIG. 2 remain the same, however, as can be seen additional steps are disclosed. For instance, after the second size is adjusted to the third size 360, the processor 120 will seek to determine whether the third size has accurately given the user the ring size for the identified at least one finger 370.

At this point, a user input will inform the processor whether the ring size is sufficiently accurate, thus inputting yes 380 or no 390, and possibly additionally information such as the actual correct size. It should be noted, as mentioned previously, a device 100, such as a personal computing device 110, may be configured in input/output relation to the processor 120. Thus, a user may input data through the device 100, and the processor 120 may output any relevant data through the device 100.

The resulting steps taken by the processor 120 will depend on the aforementioned accuracy of the third size. In the event the third size is correct 380, and the user has therefore been given an accurate ring size, the processor 120 will then store the data used throughout the ring sizing process in addition to the value of the accurate ring size as stored process data 1231. At this point, the process may naturally come to an end, as the result of an accurate ring size has been achieved.

However, this is not the end of the aforementioned stored process data 1231. Such stored process data 1231 may later be used throughout further ring sizing processes for different users. For example, the stored process data 1231 may be used when adjusting a second size into a third size 360. One way such stored process data 1231 may be used is through various routines for anatomical analyses 1200, as discussed below.

Figure 6:
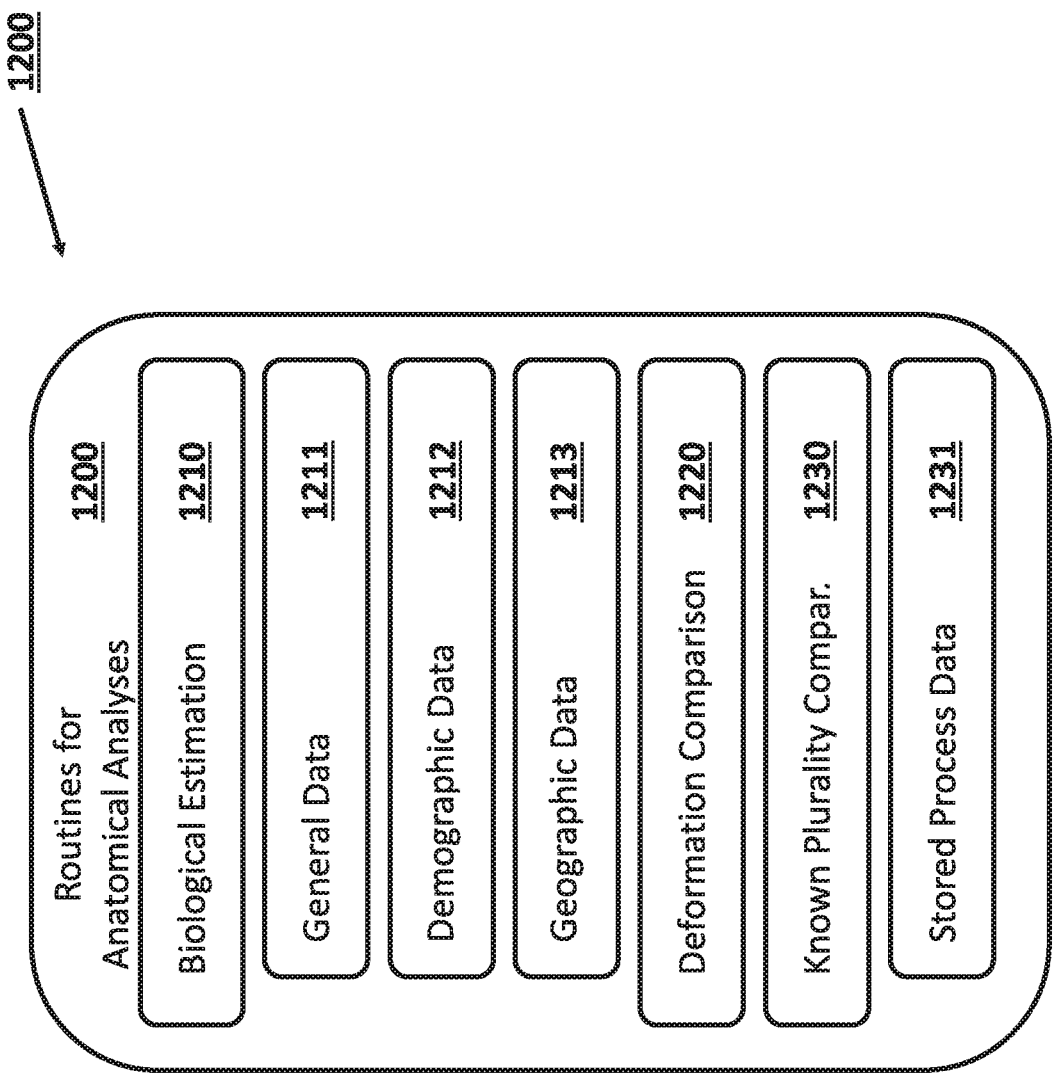
FIG. 6 is an exemplary block diagram representing a plurality of routines used in the method disclosed in FIG. 5.

As previously mentioned, the adjustment of the second size into the third size 360 involves at least comparing known ring sizes and anatomical characteristics from a plurality of known ring datum. As can be seen in FIG. 6, such comparison may involve at least one of several different routines directed towards anatomical analyses 1200, including, without limitation, biological estimation 1210, deformation comparison 1220, and a more general known plurality comparison 1230, all of which will be briefly discussed below.

Biological estimation 1210 involves estimating the proper adjustment of the second size to the third size 360 according to the general data 1211 of the at least one finger at issue. Such general data 1211 may include a variety of factors including demographic data 1212 such as race, gender, age, height, and weight, in addition to geographic data 1213 such as altitude. Using the general data 1211, an estimated value of the proper adjustment may be made. While this routine may involve only the general data 1211 and the knowledge of finger anatomy, it can be understood that this routine may be further enhanced through a known plurality comparison 1230, whereby stored process data 1231 involving fingers with similar general data 1211 may be used as a comparison to get a more precise adjustment value. For example, the processor 120 may determine a standard deviation of ring sizes found in the stored process data 1231 that are found within a defined geographic area, thus providing a more precise adjustment value according to factors specific to that user.

Deformation comparison 1220 involves comparing the finger at issue in both a regular and deformed state. As previously mentioned, the photographic image used in the process may include a plurality of images or a video, and in such instances the anatomy of the finger may be compared, by way of example, for a straight finger that is suspended in the air versus a finger that is being flexed or alternately being pressed against a table. Similar to the biological estimation routine 1210, while this routine may be performed by the processor 120 using only the data acquired from the photographic image 140, it can be understood that this routine may be further enhanced through a known plurality comparison 1230, whereby stored process data 1231 involving fingers with similar photographic images, and perhaps similar general data 1211 as described above, are used as a comparison to get a more precise adjustment value.

Referring back to the use of the stored process data 1231, it should be further understood such stored process data 1231 may be further used throughout the ring sizing process. For example, photographs with similar characteristics may be referred to when identifying the at least one finger 320 or isolating the at least one finger 330.

As previously mentioned, the resulting steps taken by the processor 120 will depend on the foregoing accuracy of the third size 370. In the event the resulting third size is not sufficiently accurate 390, the processor will instead store the actual, correct size as stored process data 1231. Thus, the processor may use stored process data 1231 in later applications of the disclosed method 300, in accordance with the routines and processes stated above. At this point, the process may now come to an end while simultaneously becoming more precise due to the input of corrected stored process data 1231.

Figure 7:
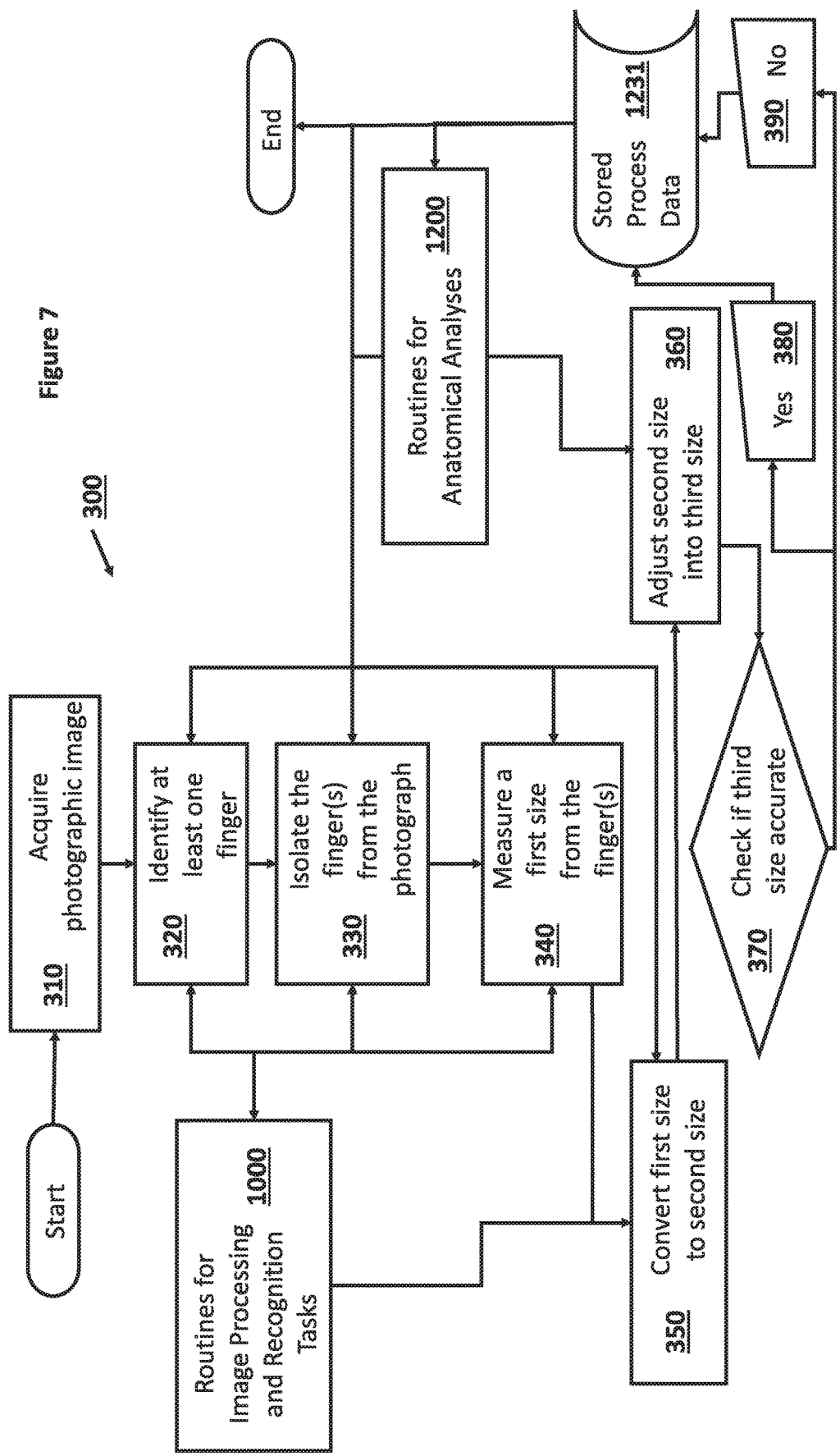
FIG. 7 represents the method disclosed in FIG. 2, further including the combined disclosures of FIGS. 3-6.

With reference to FIG. 7, disclosed is the method 300 of FIG. 2 incorporating the aforementioned routines for image processing and recognition tasks 1000, routines for anatomical analyses 1200, and the storing and use of stored process data 1231. As previously discussed, these routines 1000, 1200 and stored process data 1231, may be used in a plurality of processes involved in the method 300. Further, it should be noted the device 100 of FIG. 1 may be configured in input/output relation to the processor 120 performing the embodied method. Although the aforementioned routines 1000, 1200 and stored process data 1231 need not necessarily be used, the processes 1000, 1200 and stored process data 1231, when used in conjunction according to the method embodied in FIG. 7, will greatly enhance the processing speed and efficiency of the method 300, while likewise greatly increasing the method's 300 precision. Thus, by using the method 300 disclosed in FIG. 7, a reproducible, easy, and secret ring size may be obtained within a precision of 0.2 millimeters.

The operations described and shown in FIGS. 2-7 may be carried out or performed in any suitable order as desired in various embodiments of the disclosure, and the method may be repeated any number of times. Additionally, in certain embodiments, at least a portion of the operations may be carried out in parallel. Furthermore, in certain embodiments, fewer or more operations as described in FIGS. 2-7 may be performed.

This written description uses examples to disclose the invention, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The embodied method, and any variations thereof, may be loaded onto a general purpose computer, a special purpose computer, a processor, or other programmable data processing apparatus to produce a particular machine, such that the instructions that execute the method on the computer, processor, or other programmable data processing apparatus creates means for implementing one or more functions specified in the flow diagrams' block(s). The computer program instructions executing the performance of the embodied method may also be stored in a computer-readable memory that can direct a computer or other data processing apparatus to function in a particular manner, such that the instructions stored in the computer-readable memory produce an article of manufacture including instructions that implement one or more functions specified in the flow diagrams' block(s). As an example, embodiments of the disclosure may provide for a computer program product, comprising a computer usable medium having a computer-readable program code or program instructions embodied therein, said computer-readable program code adapted to be executed to implement one or more functions specified in the flow diagrams' block(s). The computer program instructions may also be loaded onto a computer or other programmable data processing apparatus to cause a series of operational elements or steps to be performed on the computer or other programmable apparatus to produce a computer-implemented process such that the instructions that executed on the computer or other programmable apparatus provide elements or steps for implementing the functions specified in the flow diagrams' block(s).

Accordingly, blocks of the block diagrams and flow diagrams support combinations of means for performing the specified functions and program instructions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described.

What is claimed is:

1. A method for determining a ring size for a user's finger, the method comprising:
   acquiring at least one photographic image;
   identifying, via at least one processor, at least one finger in the at least one photographic image;
   isolating, via the at least one processor, the at least one finger from the at least one photographic image;
   measuring, via the at least one processor, a first size of the at least one finger;
   converting, via the at least one processor, the first size into a second size;
   adjusting, via the at least one processer, the second size into a third size according to a plurality of routines directed towards anatomical analyses, the plurality of routines directed towards anatomical analyses comprising:
      a routine for biological estimation comprising estimating the proper adjustment of the second size to the third size according to general data of the at least one finger at issue;
      a routine for deformation comparison comprising comparing a regular state of the at least one finger at issue with a deformed state thereof; and
      a routine for a known plurality comparison comprising comparing stored process data with the at least one finger at issue to get a more precise adjustment of the second size to the third size, the stored process data comprising stored photographs with similar characteristics to the at least one finger.

2. The method as recited in claim 1, wherein the first size comprises a digital image measurement unit from the at least one photographic image.

3. The method as recited in claim 1, wherein the second size comprises a standard measurement unit.

4. The method as recited in claim 1, further comprising:
   the at least one processor storing and later accessing the stored process data for a plurality of known ring sizes.

5. The method as recited in claim 4, wherein the routine for deformation comparison further comprises a known plurality comparison between the general data acquired from the at least one photographic image and the stored process data.

6. The method as recited in claim 1, further comprising:
   the at least one processor configured in input/output relation with at least one device.

7. The method as recited in claim 6, further comprising:
   the at least one processor receiving, via the at least one device, a user input indicating an accuracy of the third size.

8. The method as recited in claim 7, further comprising:
   the at least one processor storing and later accessing the accuracy of the third size.

9. The method as recited in claim 6, further comprising:
   the at least one device configured to capture the photographic image.

10. A method for determining ring sizes, the method comprising:
    acquiring at least one photographic image;
    performing, via at least one processor, at least one of a plurality of routines directed towards image processing and recognition tasks for the identification and isolation of at least one finger in the at least one photographic image, the plurality of routines directed towards image processing and recognition tasks comprising shadow extraction, image segmentation, a bounding box, perspective identification, dual camera data, exif data, sensor data analyses, and computer vision;
    measuring, via the at least one processor, the at least one finger from the at least one photographic image for the determination of a first size;
    converting, via the at least one processor, the first size into a second size;
    adjusting, via the at least one processor, the second size into a third size according to at least one of a plurality of routines directed towards anatomical analyses, the plurality of routines directed towards anatomical analyses comprising:
       a routine for biological estimation comprising estimating the proper adjustment of the second size to the third size according to general data of the at least one finger at issue;
       a routine for deformation comparison comprising comparing a regular state of the at least one finger at issue with a deformed state thereof; and
       a routine for a known plurality comparison comprising comparing stored process data with the at least one finger at issue to get a more precise adjustment of the second size to the third size, the stored process data comprising stored photographs with similar characteristics to the at least one finger.

11. The method as recited in claim 10, wherein the first size comprises a digital image measurement unit from the at least one photographic image.

12. The method as recited in claim 10, wherein the second size comprises a standard measurement unit.

13. The method as recited in claim 10, further comprising:
    the at least one processor storing and later accessing the stored process data for a plurality of known ring sizes.

14. The method as recited in claim 10, further comprising:
    the at least one processor configured in input/output relation with at least one device and thereby receiving, via the at least one device, a user input indicating an accuracy of the third size.

15. The method as recited in claim 14, further comprising:
    the at least one processor storing and later accessing the accuracy of the third size.

16. The method as recited in claim 14, wherein the at least one device is configured to capture the photographic image.

17. A method for determining ring sizes, the method comprising:
    acquiring at least one photographic image;
    performing, via at least one processor, at least one of a plurality of routines directed towards image processing and recognition tasks for the identification and isolation of at least one finger in the at least one photographic image, the plurality of routines directed towards image processing and recognition tasks comprising shadow extraction, image segmentation, a bounding box, perspective identification, dual camera data, exif data, sensor data analyses, and computer vision;
    measuring, via the at least one processor, a first size of the at least one finger;
    converting, via the at least one processor, the first size into a second size;
    accessing, via the at least one processor, stored process data for a plurality of known ring sizes, the stored process data comprising stored photographs with similar characteristics to the at least one finger and a correct ring size associated therewith;
    adjusting, via the at least one processer, the second size into a third size according to a plurality of routines directed towards anatomical analyses, the plurality of routines directed towards anatomical analyses comprising:
- a routine for biological estimation comprising estimating the proper adjustment of the second size to the third size according to general data of the at least one finger at issue;
- a routine for deformation comparison comprising comparing a regular state of the at least one finger at issue with a deformed state thereof; and
- a routine for a known plurality comparison comprising comparing stored process data with the at least one finger at issue to get a more precise adjustment of the second size to the third size;

receiving, via at least one device connected to the at least one processor, a user input indicative of an accuracy of the third size; and storing and accessing, via the at least one processor, the accuracy of the third size.

18. The method as recited in claim 17, wherein the first size comprises a digital image measurement unit from the at least one photographic image.

19. The method as recited in claim 17, wherein the second size comprises a standard measurement unit.

20. The method as recited in claim 17, wherein the at least one device is configured to capture the photographic image.

* * * * *